United States Patent [19]

Taniguchi et al.

[11] Patent Number: 4,690,017
[45] Date of Patent: Sep. 1, 1987

[54] SHIFT CONTROL SYSTEM OF AUTOMATIC TRANSMISSION

[75] Inventors: Hiroji Taniguchi; Kunihiro Iwatsuki; Yoshio Shindou, all of Toyota, Japan

[73] Assignee: Toyota Jidosha Kabushiki Kaisha, Aichi, Japan

[21] Appl. No.: 880,029

[22] Filed: Jun. 30, 1986

[30] Foreign Application Priority Data

Jul. 1, 1985 [JP] Japan .................................. 60-144340
Aug. 20, 1985 [JP] Japan .................................. 60-182485

[51] Int. Cl.$^4$ ............................................. B60K 41/10
[52] U.S. Cl. ........................................ 74/866; 74/740; 74/877; 364/424.1
[58] Field of Search ................ 74/866, 865, 862, 877, 74/740, 752 A, 752 D; 364/424.1; 192/0.052, 0.073, 0.075, 0.092

[56] References Cited

U.S. PATENT DOCUMENTS

| | | | |
|---|---|---|---|
| 4,274,306 | 6/1981 | Yokoi et al. | 74/866 |
| 4,282,957 | 8/1981 | Sugimoto et al. | 74/740 X |
| 4,312,248 | 1/1982 | Sugimoto et al. | 74/866 X |
| 4,324,153 | 4/1982 | Sugimoto et al. | 74/866 |
| 4,367,528 | 1/1983 | Kawamoto et al. | 364/424.1 X |
| 4,368,650 | 1/1983 | Numazawa et al. | 74/740 |
| 4,411,174 | 10/1983 | Yokoi et al. | 74/865 X |
| 4,567,788 | 2/1986 | Miller | 74/752 A X |
| 4,640,393 | 2/1987 | Nishimura et al. | 74/866 X |

FOREIGN PATENT DOCUMENTS

| | | | |
|---|---|---|---|
| 138948 | 10/1979 | Japan | 74/740 |
| 76244 | 6/1980 | Japan | 74/740 |
| 2147961 | 5/1985 | United Kingdom | 74/866 |
| 2154679 | 9/1985 | United Kingdom | 74/866 |

Primary Examiner—Leslie Braun
Assistant Examiner—Dwight G. Diehl
Attorney, Agent, or Firm—Parkhurst & Oliff

[57] ABSTRACT

A shift control system of an automatic transmission, wherein first and second transmission sections capable of automatically switching gear stages independently are provided and the first and second transmission sections are shifted to thereby achieve multi-stage shifts, comprising: a device for starting a shift in the second transmission section after the start of a shift in said first transmission section; and a device for ending the shifts in the first and the second transmission sections in synchronism with each other. Even when the first and the second transmission sections are simultaneously shifted, satisfactory shift characteristics are maintained, and further, the suceeding shift control in the second transmission section is adaptively controlled in accordance with the result of the preceding shift, so that the best shift can be achieved regardless of variations in the respective transmission sections.

21 Claims, 11 Drawing Figures

| | $C_1$ | $C_2$ | $C_0$ | $B_0$ | $B_1$ | $B_2$ | $B_3$ | 1st.T.M.S | 2nt.T.M.S |
|---|---|---|---|---|---|---|---|---|---|
| P.N | | | | | | | | | |
| R | | O | O | | | | O | | |
| 1 | O | | | | | | X | 1st | Low |
| 2 | O | | | O | | | X | ↑ | High |
| 3 | O | | O | | X | O | | 2nd | Low |
| 4 | O | | | O | X | O | | ↑ | High |
| 5 | O | O | O | | | O | | 3rd | Low |
| 6 | O | O | | O | | O | | ↑ | High |

Columns $C_1$–$B_3$ grouped under B; 1st.T.M.S and 2nt.T.M.S grouped under A.

| THROTTLE OPENING Ath | POWER ON UP SHIFT 2→3 | | POWER ON UP SHIFT 4→5 | |
|---|---|---|---|---|
| | Td INITIAL VALUE | td | Td INITIAL VALUE | T4 INITIAL VALUE |
| Ath7 | 0.60 | 0.05 | 1.10 | 0.50 | 0.05 | 1.00 |
| Ath6 | ← | ← | ← | ← | ← | ← |
| Ath5 | 0.65 | ← | 1.15 | 0.55 | ← | 1.05 |
| Ath4 | ← | ← | ← | ← | ← | ← |
| Ath3 | 0.70 | ← | 1.20 | 0.60 | ← | 1.10 |
| Ath2 | ← | ← | ← | ← | ← | ← |
| Ath1 | ← | ← | ← | ← | ← | ← |

FIG. 9

| THROTTLE OPENING Ath \ OIL TEMP | ~40°C | 40°C~60°C | 60°C~80°C | 80°C~100°C | 100°C~120°C | 120°C~ |
|---|---|---|---|---|---|---|
| | | POWER ON UP SHIFT 2→3 | | | | |
| A th7 | 0.55 | 0.60 | 0.65 | 0.70 | 0.75 | 0.80 |
| A th6 | ↑ | ↑ | ↑ | ↑ | ↑ | ↑ |
| A th5 | 0.60 | 0.65 | 0.70 | 0.75 | 0.80 | 0.85 |
| A th4 | 0.55 | 0.60 | 0.65 | 0.70 | 0.75 | 0.80 |
| A th3 | 0.50 | 0.55 | 0.60 | 0.65 | 0.70 | 0.75 |
| A th2 | ↑ | ↑ | ↑ | ↑ | ↑ | ↑ |
| A th1 | ↑ | ↑ | ↑ | ↑ | ↑ | ↑ |

SHIFT CONTROL SYSTEM OF AUTOMATIC TRANSMISSION

BACKGROUND OF THE INVENTION

This invention relates to a shift control system of an automatic transmission, and more particularly to an automatic transmission wherein the shift control system includes first and a second transmission sections capable of automatically switching gear stages separately of one another. The first and second transmission sections are shifted simultaneously or alternately to achieve multi-stage shifts.

Along with a marked increase in the use of automatic transmissions to motor vehicles to improve fuel consumption, there has been introduced adopted transmissions wherein a socalled overdrive device, in which a transmission gear ratio is less than 1. The device is connected in series to an output shaft of a first transmission section capable of automatically shifting gear stages as a function of vehicle speed, throttle opening and the like, as a second transmission section.

Figure 2:
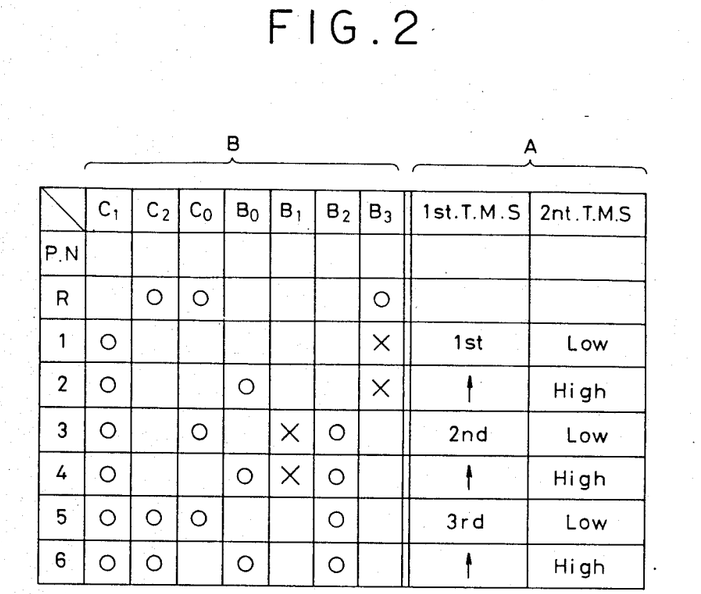
FIG. 2 is a chart showing the actuated states of the various frictionally engaging devices in the above-mentioned automatic transmission.

Furthermore, such a transmission is also known, wherein the second transmission section is actively tuned to shifts of the first transmission section, such that when the first transmission section and the second transmission section are simultaneously or alternately shifted, for example when the shift control shown in FIG. 2 is performed, multi-stage shifts of six forward gear stages can be achieved.

The above-described arrangement makes it possible for existing automatic transmissions to be utilized as the first transmission section, whereby changes in design are minimized, so that multi-stage shifts can be achieved. As a result, many advantages are achieved such as improving the rate of fuel consumption, shift shocks are reduced and load is relieved from a frictionally engaging device by allowing multi-stage shifts.

However, in the automatic transmission wherein the first and the second transmission sections are shifted simultaneously or alternately to thereby achieve the multi-stage shifts, cases occur in which new gear stages are achieved by shifting the first and the second transmission sections in reverse directions as during an up shift from 2nd gear to 3rd gear, an up shift from 4th gear to 5th gear or down shifts reversing the aforesaid up shifts. At this time, such disadvantages have been presented that when the respective shifts are controlled separately of one another, an increase in shift shock is not avoidable. Moreover, while an up shift is in operation, the shift is started from a down shift, an up shift is performed immediately after a down shift or a down shift is performed immediately after an up shift, the shift characteristics cause undesirable driving feelings.

And, when the completion of a shift in the second transmission section is earlier than the completion of a shift in the first transmission section, an abrupt increase in output shaft torque is produced in a remaining portion of the inertia phase in the first transmission section, thus increasing shift shock.

Furthermore, when shift timings of both transmission sections are only controlled by timers, oil-pressure levels of frictionally engaging devices or the like, it is extremely difficult to synchronize the controls of the aforesaid delicate starting and ending timings with intended timings. More specifically, shift starting times and inertia phase (during real shifting) of shift are delicately dispersed due to variations in parts of the automatic transmission and in use conditions, whereby errors in shift control timings due to these variations cannot be neglected.

Furthermore, the a problem has also been raised that the time from a shift start command to the start of an inertia phase varies depending on the temperature of oil in the automatic transmission, a shift interval (the elapsed time from the preceding shift) and the like, such that it is difficult to make the shift completions of both transmission sections coincide with each other.

SUMMARY OF THE INVENTION

The present invention was developed to obviate the abovedescribed disadvantages of the prior art. Accordingly, it is an object of the present inventions to provide a shift control system of an automatic transmission, wherein when first and second transmission sections are shifted in reverse directions to thereby achieve a new gear stage for example, a shift shock is low and improved shift feeling is obtained at all times, regardless of various dispersion and uses of the motor vehicle.

A first aspect of the present invention contemplates a shift control system of an automatic transmission, wherein first and second transmission sections capable of automatically switching gear stages independently are provided, and the first and second transmission sections are shifted to thereby achieve multi-stage shifts, including: means for starting a shift in the second transmission section after the start of a shift in the first transmission section; and means for ending the shift in the second transmission section in synchronism with the ending of the shift in the first transmission section; so that the shift control can be satisfactorily carried out.

A second aspect of the present invention contemplates a shift control system of an automatic transmission, wherein first and second transmission sections capable of automatically switching gear stages separately of each other are provided, and the first and second transmission sections are shifted to thereby achieve multi-stage shifts, including: means for starting a shift in the second transmission section after the start of a shift in the first transmission section; means for ending the shift in the second transmission section in synchronism with the ending of the shift in the first transmission section; and means for correcting succeeding shift controls in accordance with the results of preceding shift timing; so that the shift control of the first aspect of the present invention can be reliably carried out for all motor vehicles regardless of variations in the motor vehicles.

In this application, one transmission section, wherein a large change in gear ratio takes place in making a shift to a specific gear stage, is referred to as a "first transmission section" and the other transmission section, wherein a smaller change in gear ratio takes place, is referred to as a "second transmission section". As a consequence, the "first transmission section" and the "second transmission section" of the present invention are interchangeable with respect to certain types of shifts. However, in general, as shown in FIG. 2, since a specific transmission section is constantly set at a larger gear ratio change than that of the other transmission section in performing the simultaneous shifting, the specific transmission section may be fixedly referred to as the "first transmission section".

According to the first aspect of the present invention, the shift in the second transmission section is started after the start of the shift in the first transmission section and the shift in the second transmission section is ended in synchronism with the end of the shift in the first transmission section. As a result, an up shift can be positively started from a high gear shift, and a down shift can be positively started from a low gear shift. Cases in which an up shift is performed immediately after the down shift or a down shift is performed immediately after an up shift, causing undesirable driving feelings, will not occur. As abrupt increase in the output shaft torque in the remaining portion of the inertia phase of the first transmission section are avoided, thus resulting in advantageous characteristics.

In the second aspect of the present invention, in performing the above-described controls, a so-called adaptive control, in which succeeding shift control in the second transmission section are corrected in accordance with preceding shift timing, is carried out, so that optimum shift characteristics can be constantly obtained in all motor vehicles.

In a preferred embodiment of the present invention, the timing of the start of a shift in the second transmission section is changed in accordance with an engine-load, oil temperature in the automatic transmission, a vehicle speed, the type of shift and the shift interval. Consideration of the engine load and the vehicle speed is preferred because differences in these factors lead to differences in the oil flow through oil lines. Consideration of the types of shifts is preferred because differs for flow through the oil lines various shifts.

Consideration of the oil temperature in the automatic transmission is preferred because when the oil temperature in the automatic transmission is high, more oil pressure in frictionally engaging parts leaks from oil lines in a hydraulic circuit than when the oil temperature is low. As a consequence, when the oil pressure is supplied to the frictionally engaging devices, it takes a long time from the application of oil pressure to the start of an inertia phase in the transmission section. On the contrary, when the oil pressure is drained from the frictionally engaging devices, it takes a short time from the start of oil pressure drain to the start of an inertia phase in the transmission section. Furthermore, when the oil temperature is extremely low (0° C. or below, for example), it takes longer for the oil pressure to be supplied to the frictionally engaging devices, because of a high viscosity resistance. The above-described influence is manifested in the timings of the start of shift and the end of shift in both transmission sections when the lengths of the oil lines concerned with the shifts in the first and the second transmission sections are different from each other or when the supply and the drain of the oil pressure are reversed in the first and the second transmission sections. Even in these cases, if the timings of the start of shifts are determined with consideration of the oil temperature, then the shifts in the first and the second transmission sections can be ended accurately and in synchronism with each other.

Consideration of the shift interval is preferred because when the oil pressure is supplied to frictionally engaging devices immediately after the draining of oil pressure from the frictionally engaging devices, the oil still remains in a hydraulic circuit of these frictionally engaging devices, causing the time of oil supply to decrease. In this case, because the frictionally engaging devices in the first and the second transission sections are different in oil line arrangement from each other, the influences of the remaining oil pressures should naturally be different from each other. Even in this case, if the timings of the starts of shifts are determined with consideration of the time from the preceding shift, then the shifts in the first and the second transmission sections can be ended accurately and in synchronism with each other.

In another preferred embodiment of the present invention, the results of the above-described shift timings are judged from variations in the rotation speeds of a rotatable member of the automatic transmission and variations in the engine speed. With this arrangement, the results of shift timings can be properly judged in accordance with actual conditions.

In another preferred embodiment of the present invention, the means for correcting the shift control comprises the changing of an acting force of the frictionally engaging devices in the second transmission section by duty control of the oil pressure. With this arrangement, the shift time of the second transmission section is controlled, thereby avoiding abrupt changes in the output torque of the second transmission section.

In a further preferred embodiment of the present invention, the means for correcting the shift control comprises the changing of the timing of a shift starting command for the second transmission section relative to the shift of the first transmission section. With this arrangement, the start of a shift in the second transmission section can be accurately controlled and the shift ending timing in the second transmission section can thus be controlled.

In a further preferred embodiment of the present invention, the means for correcting the shift control is such that the timing of the acting force of the frictionally engaging devices of the second transmission section is released rapidly. With this arrangement, the shift ending timing of the second transmission section can be brought into synchronism with that of the first transmission section, thereby avoiding the staying of the remaining portion of the inertia phase in the second transmission section for a long time after the completion of the shift in the first transmission section.

In a further preferred embodiment of the present invention, the degree of correction of the shift control is changed in accordance with the engine load, the vehicle speed, the type of shift, the oil temperature in the automatic transmission and the shift interval. The reasons the consideration of these factors is preferred has been addressed. With this arrangement, the correction of shift control is properly and effectively carried out.

In a further preferred embodiment of the present invention, changes applied to the shift control are limited to a predetermined scope. With this arrangement, an unreasonably large correction can be avoided.

In a further preferred embodiment of the present invention, when there is no change in engine load during a shifting, the succeeding shift control in the second transmission section is corrected in accordance with the preceding shift timing. With this arrangement, the succeeding shift is not inproperly corrected as a result of shifting performed under the special conditions.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein.

DESCRIPTION OF THE PREFERRED EMBODIMENTS

The present invention will be described in detail with reference to the accompanying drawings which illustrate preferred embodiments of the present invention.

FIG. 2 shows a case in which first and second transmission sections are simultaneously shifted in reverse directions to thereby achieve a new gear stage, providing shifts between 2nd gear and 3rd gear or shifts between 4th gear and 5th gear and the like. Since shifting between these two parts of gears is alike, description will be given of a shift from the 2nd gear stage to the 3rd gear as an example wherein the first transmission section is high gear shifted and simultaneously the second transmission is low gear shifted, whereby the automatic transmission as a whole is shifted up.

Figure 1:
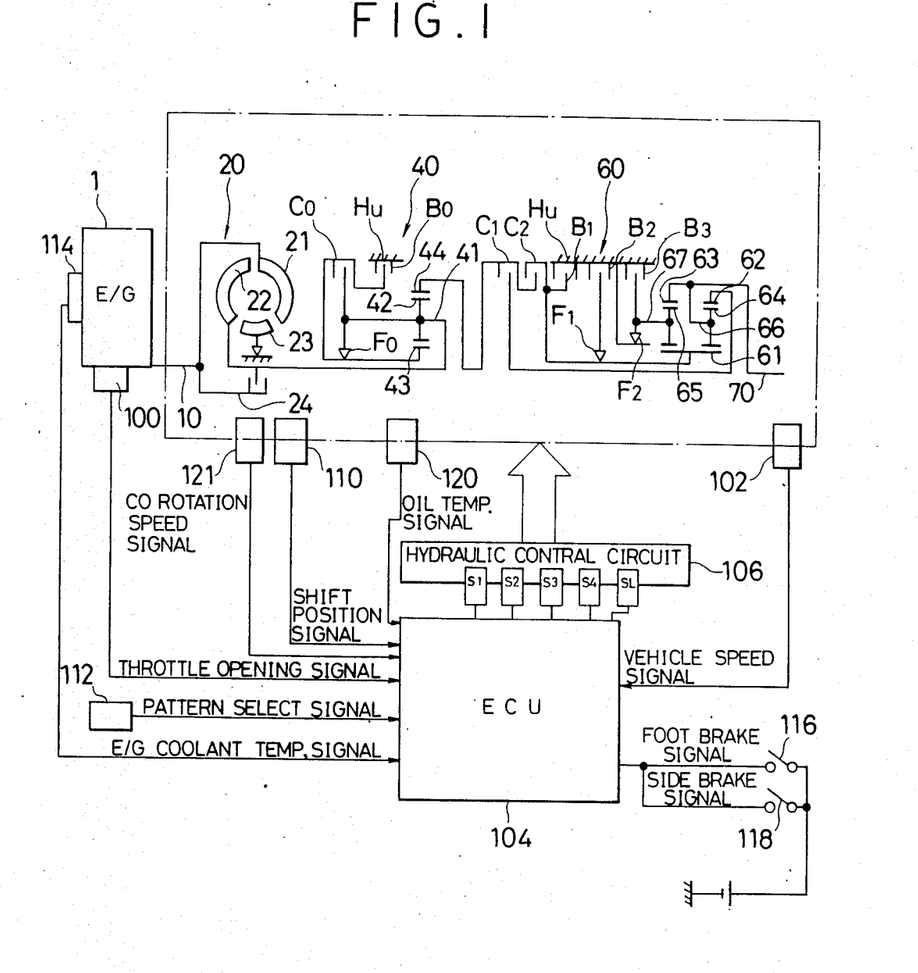
FIG. 1 is a schematic block diagram showing the general arrangement of an automatic transmission for a motor vehicle, to which is applied an embodiment of the present invention.

FIG. 1 shows the general outline of an automatic transmission, to which is applied an embodiment of the present invention.

This automatic transmission includes a torque converter 20, a second transmission section 40 and a first transmission section 60, having thereon forward gear stages and one backward gear stage.

The torque converter 20 includes a pump 21, a turbine 22, a stator 23 and a lockup clutch 24. The pump 21 is connected to a crankshaft 10 of an engine 1, and the turbine 22 is connected to a carrier 41 of a planetary gear unit in the second transmission section 40.

In the second transmission section 40, a planetary pinion 42, rotatably supported by the carrier 41 is in mesh with a sun gear 43 and a ring gear 44. Furthermore, a clutch C0 and a one-way clutch F0 are interposed between the sun gear 43 and the carrier 41. A brake B0 is interposed between the sun gear 43 and a housing Hu.

The first transmission section 60 has provided thereon two trains of front and rear planetary gear units. These planetary gear units include a common sun gear 61, ring gears 62 and 63, planetary pinions 64 and 65 and carriers 66 and 67.

The ring gear 44 in the second transmission section 40 is connected to the ring gear 62 through a clutch C1.

Furthermore, a clutch C2 is interposed between the ring gear 44 and the sun gear 61. Further, the carrier 66 is connected to the ring gear 63, and the carrier 66 and the ring gear 63 are connected to an output shaft 70. Brakes B1 and B2 and a one-way clutch F1 are interposed between the sun gear 61 and the housing Hu.

In this automatic transmission, the above-described transmission sections are provided, and electromagnetic solenoid values S1–S4 and SL in a hydraulic control circuit 106 are actuated and controlled in accordance with a preset shift pattern by a central processing unit (CPU). Signals from a throttle sensor 100 for detecting a throttle opening which reflects the load conditions of the engine 1 and from a vehicle speed sensor 102 for detecting a vehicle speed and so forth are fed into the CPU and a combination of engagements among clutches, brakes and the like, as shown in portion of B in FIG. 2 is performed to achieve the shift control.

In FIG. 2, o indicates engaged states and x indicates engaged states, only when an engine brake is used.

Figure 4:
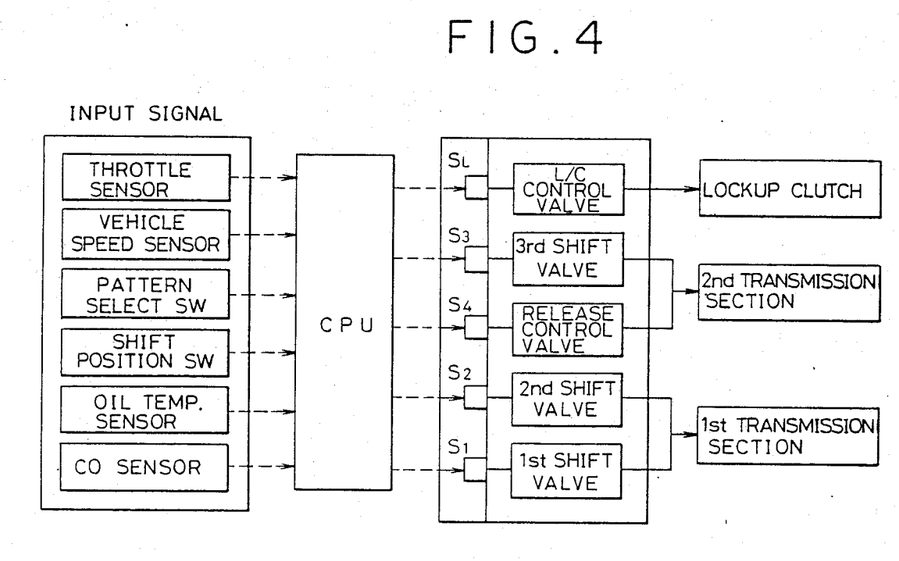
FIG. 4 is a block diagram showing the relationship between an electromagnetic solenoid valve and a shift valve and the like in the hydraulic control circuit.

The electromagnetic solenoid valves S1 and S2 control 1st and 2nd shift valves in the first transmission section 60 as shown in FIG. 4. The solenoid valve S3 controls a 3rd shift valve for switching between the higher speed side and the lower speed side of the second transmission section 40. The solenoid valve S4 controls a release control valve to be described hereunder. The solenoid valve SL controls a lockup clutch 24 of the torque converter 20.

Additionally, in FIG. 1, designated at 110 is a shift position sensor which is operated by a driver to detect positions of N, D, R and the like, 112 is a pattern select switch to select E (economical running), P (power running) or the like, 114 is a coolant temperature sensor to detect the coolant temperature of the engine, 116 is a foot brake and 118 is a brake switch to detect an action of a side brake, respectively.

In this embodiment, in addition to the aforesaid input signals, the CPU 104 has inputted thereto a signal from a C0 drum sensor 121 for recognizing the start of a change in the rotation speed of a C0 drum member of the second transmission section in response to a shift command and a signal from an oil temperature sensor 120 which senses the oil temperature of the automatic transmission.

Figure 3:
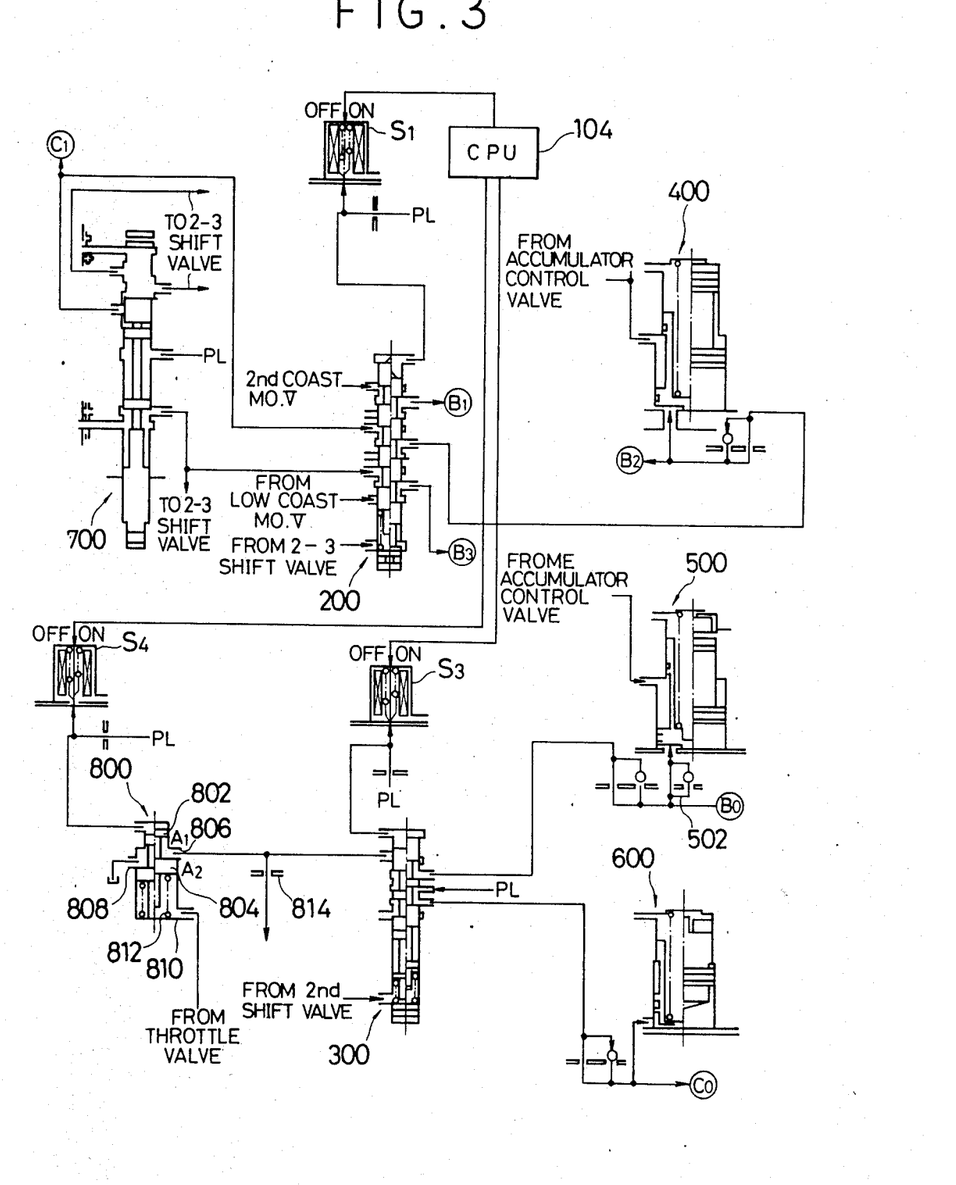
FIG. 3 is a circuit arrangement drawing showing a portion of the hydraulic control circuit.

FIG. 3 shows the essential portions of the hydraulic control circuit 106. Referring to this figure, denoted at 200 is a 1st shift valve for switching between 1st gear and 2nd gear in the first transmission section 60, S1 is a solenoid valve for controlling the switching of the 1st shift valve, 300 is a 3rd shift valve for switching between the higher speed side and the lower speed side of the second transmission section 40, S3 is a solenoid valve for controlling the switching of a 3rd shift valve 300, 400, 500 and 600 are accumulators for controlling the transient characteristics of the oil pressure in oil lines to the brakes B2, B0 and the clutch C0, and 700 is a manual valve operated in association with a shift lever operable by a driver. Since the arrangement and actions of these component parts themselves are basically similar to those in the conventional system, a detailed description of these component parts are omitted.

Designated at 800 is a release control valve for controlling the drain oil pressure from the 3rd shift valve 300 to control the time duration and acting pressure when the action by the brake B0 is released. The release control valve 800 includes two lands 802 and 804 which have face areas A1 and A2 (A1<A2) different from each other. Drain oil pressure from the brake B0 is inputted into a port 806 formed at an intermediate position of the two lands 802 and 804. This release control valve 800 can be duty-controlled by a solenoid valve S4 operated by CPU 104. The duty-control itself is well known.

Figure 5:
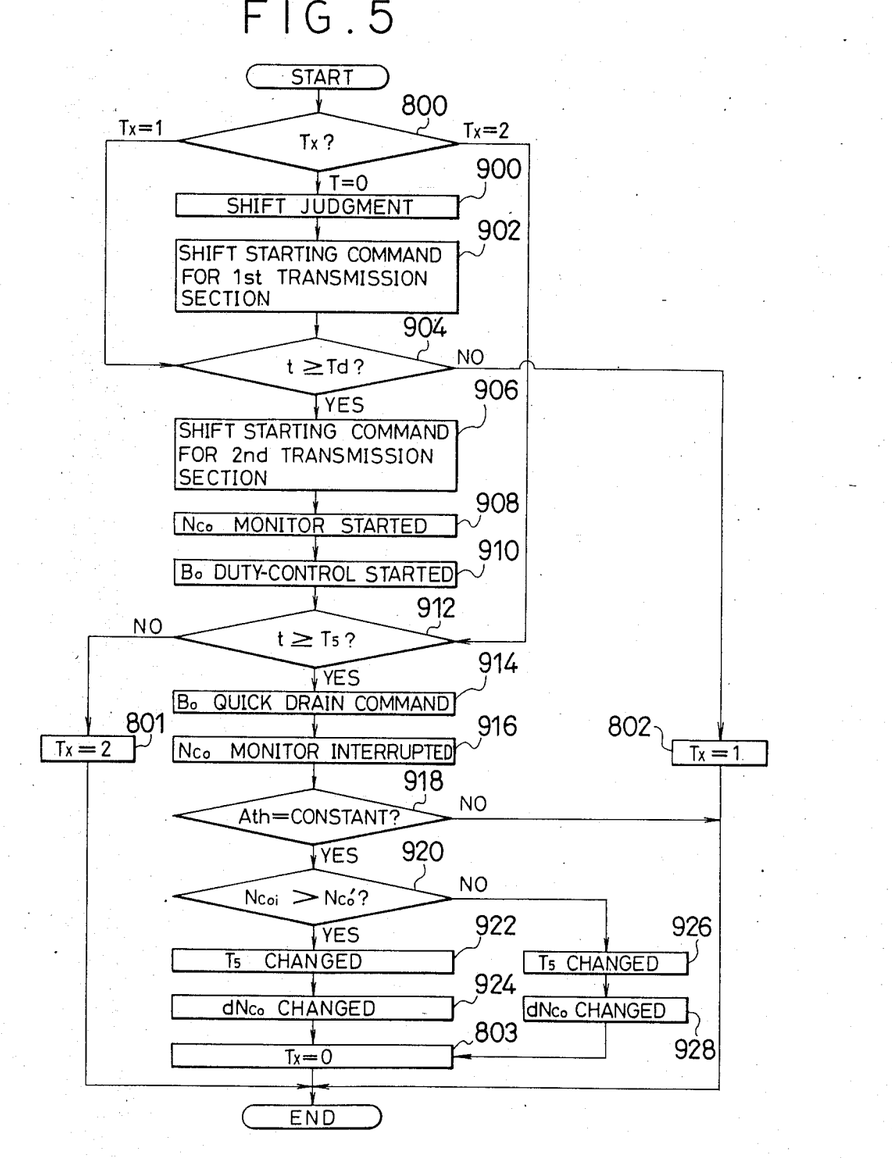
FIG. 5 is flow chart showing a control flow in the system of the above embodiment.

A first example of a control flow by use of the system in this embodiment is shown in FIG. 5. In the beginning, a flag Tx is set at zero in step 800. In step 900, shift judgment is made by a shift point predetermined by the vehicle speed and the throttle opening. In step 902, a shift command (an ON command of the solenoid valve S1 for switching the first shift valve 200) for the 1st transmission section 60 is outputted, thereby supplying oil to the brake B2.

Figure 8:
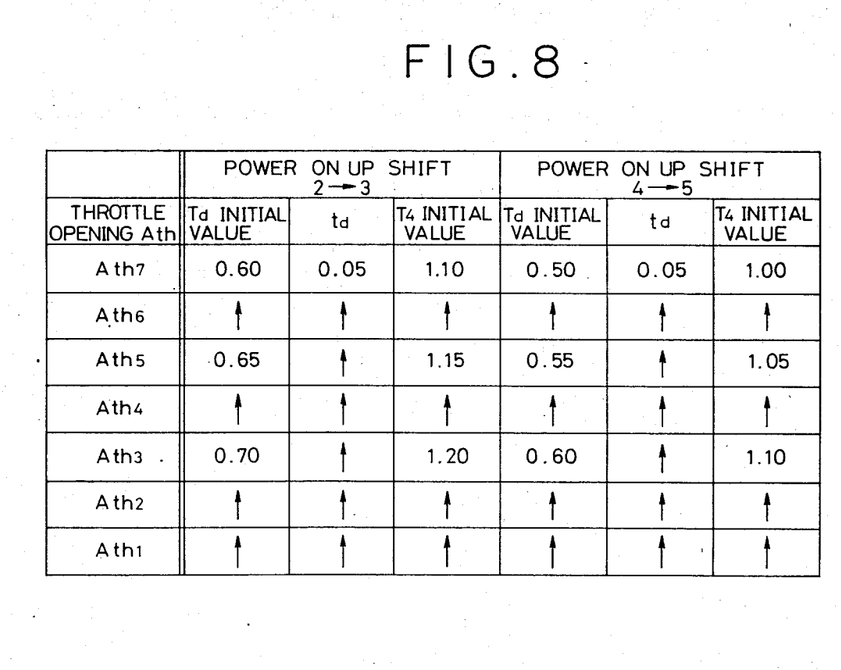
FIG. 8 is a chart showing examples of maps of Td, td and T4.

In step 904, the flow is delayed for a time Td. The time Td is a constant from the command for the first transmission section. This Td is determined in accordance with the throttle opening and the types of shifts as shown in FIG. 8, for example, so that a low gear shift of the second transmission section 40 can be started during an inertia phase of the first transmission section 60. In step 906, a shift starting command (an ON command of the solenoid valve S3 for switching the 3rd shift valve S3) for the second transmission section 40 is outputted, thereby draining oil from the brake B0.

In step 908, the rotation speed NC0 of the C0 drum member is monitored. When the start of the C0 drum member is detected, in step 910, a duty-control starting command is outputted and B0 oil pressure in the brake B0 is duty-controlled by the solenoid valve S4 so that the valve of a change rate dNC0 of the rotation speed NC0 of the C0 drum member can coincide with a preset value.

By this duty-control algorithm, while the transmission torque level of the second transmission section 40 is maintained relatively high, the shift ending time point of the second transmission section 40 can be regulated.

More specifically, as shown in FIG. 3, when the oil pressure of the brake B0 is drained, the return speed of the accumulator 500 is suppressed by the action of an orifice 502 with a check valve, whereby if the solenoid valve S4 is turned off, the release control valve 800 is brought into a stage shown to the left side in the drawing, so that ports 806 and 808 are short-circuited to thereby rapidly drain the oil pressure of the brake B0. When the solenoid valve S4 is turned on, the release control valve 800 is brought into a state shown to the right side in the drawing, wherein the port 808 is closed and the brake B0 is slowly drained through an orifice 814. As a result, the acting oil pressure of the brake B0 is maintained at a value determined by this duty ratio, so that a desired torque transmitting force can be maintained and the shifting can end after a desired time duration.

More specifically, when the acting force on the second transmission section side is rapidly released, neutral portions instantaneously occur in the intermediate portions of a series of the torque transmission systems. Accordingly, when the second transmission section is disposed at the input side of the first transmission section as in this embodiment, the engine speed rapidly increases in proportion to the throttle opening and the rotatable members of the first transmission section are freed from their load and rapidly accelerate. However, when an output shaft (output shaft of the automatic transmission) torque of the first transmission section rapidly decreases, the shift shock increases accordingly.

Even when the second transmission section is disposed at the output side of the first transmission section, if the second transmission section is removed from the torque transmission system, then an output shaft torque of the second transmission section decreases similarly and the shift shock also increases. In this embodiment, the acting force when the second transmission section is released is maintained at a desired value for a desired time duration by the control of the duty ratio, so that the output shaft torque is not abruptly changed. Additionally, an initial value of this duty ratio is determined by the throttle opening, the vehicle speed and the type of shift.

Again referring to FIG. 5, the duty-control is completed in a time duration T5 after the duty-control is started (step 912). The solenoid valve S4 is turned off to thereby quickly drain the oil pressure from the brake B0 (step 914). This process is carried out because, if the completion of the shift in the second transmission section is delayed from the completion of the shift in the first transmission section, the completion of the shift in the second transmission section should be quickened. Even when the completions of the shifts in the first and the second transmission sections are brought into synchronism with each other, if the oil pressure on the brake B0 remains after this synchronism, then the output shaft torque is decreased due to the drag of the brake B0.

In step 914, when the duty control of brake B0 of brake B0 is completed a and quick drain has started, monitoring of NC0 is stopped (step 916). In step 918, judgment is made as to whether a throttle opening Ath during shifting has been constant in value or not, and, when it is judged that the value has been constant, an adaptive control flow is carried out in order to make the succeeding control more proper.

Thus, the shift adopted as the basis of the adaptive control is restricted to the shift in which the throttle opening (engine load) has been at a constant value, because it is therefore prevented from correcting the succeeding shift improperly as referenced from the result of shift performed under the special conditions.

The adaptive control is carried out in the following manner. First, a comparison is made between a plurality of sampling values NC0i of NC0 monitored in step 920 and a synchronized rotation speed NC0' of the C0 drum member. The synchronized rotation speed NC0' is calculated from a rotation speed N0 of the output shaft at completion of the shift, according to the formula $NC0' = N0 \times (1+p)$, where p is a gear ratio of the first transmission section. When the valve of NC0i is greater than the valve of NC0' the completion of the shift in the second transmission section 40 is earlier than the completion of the shift in the first transmission section 60. In step 922, a value of the time T5 is determined to be a time from the start of rotation of the C0 drum member to the completion of the shift in the first transmission section.

Additionally, judgment as to whether the shift in the first transmission section is completed or not is made from a determination as to whether the rotation speed NC0 of the C0 drum member has reached the synchronized rotation speed NC0' as calculated from an output shaft rotation speed N0. If the shift in the second transmission section 40 is completed earlier than the shift in the first transmission section 60, then the rotation speed NC0 of the C0 drum member exceeds the synchronized rotation speed NC0', and therefore the time at which the rotation speed NC0 next reaches the synchronized rotation speed NC0' is adopted as the time of the completion of the shift in the first transmission section 60.

In step 924, the value of dNC0 is changed so that the value NC0 can be varied within a range between zero and the synchronized rotation speed NC0' during the duty control time T5 preset in step 922. As a result, the duty ratio is changed and set.

When the value of NC0i is not greater than the value of NC0' in step 920, it is conceivable that the completion of the shift in the second transmission section 40 is delayed from the completion of the shift in the first transmission section 60 or the completion of both shifts are synchronized with each other. In this case, in step 926, the relationship of T5=T5−t5 is adopted. Here, t5 is a constant determined in accordance with the throttle opening and the type of shift.

Thereafter, in step 928, dNC0 is determined in accordance with T5 thus changed, to thereby synchronize the completion of the shifts with each other.

Steps 800–803, relating to the flag Tx, are executed to substantially stop the control flow until the respective conditions are established in step 904 and 912.

Figure 10:
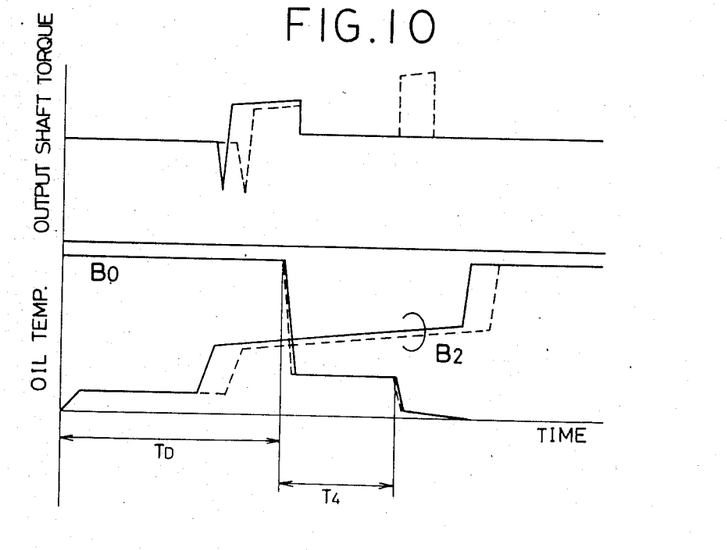
FIGS. 10 and 11 are graphs of shift characteristics showing the comparations wherein the comparing synchronous shift timings and unsynchronous shift timings.

According to this embodiment, regulation of the timings of the shifts in the first and the second transmission sections 60 and 40 is carried out by the duty-control in association with the throttle opening, the vehicle speed and the types of shifts, and the adaptive control is performed by a change in time of the duty ratio control, so that the control can be carried out with high accuracy and the shift shock can be minimized as shown in FIG. 10.

Figure 6:
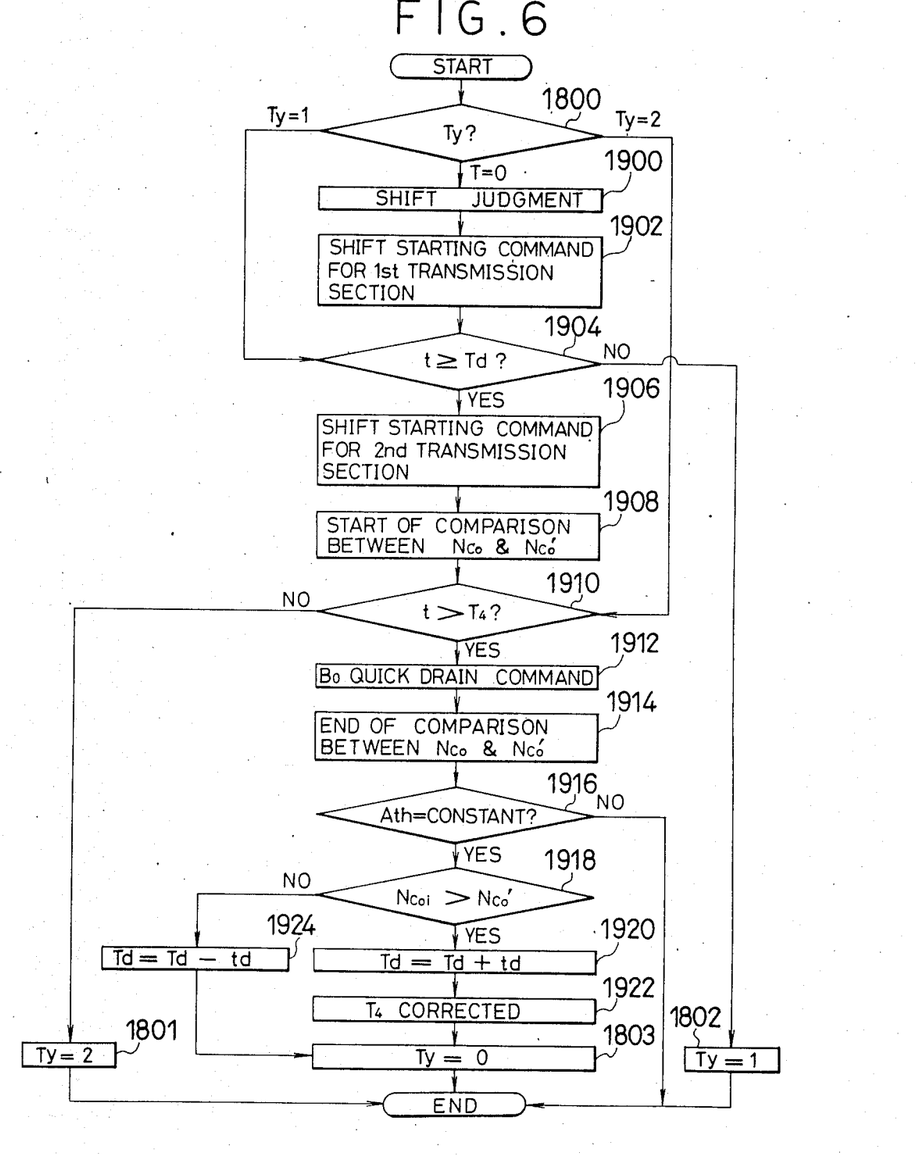
FIG. 6 is a flow chart showing another control flow.

Next, FIG. 6 shows a second example of the control flow. The process up to step 1906 is similar to that in the preceding embodiment.

In step 1908, a comparison is started between the rotation speed NC0 of the C0 drum member and the rotation speed NC0' of the C0 drum member when shifts are completed.

Subsequently, when a time T4 elapses from a supply command to brake B2 in step 1910, a quick drain command to brake B0 is outputted in step 1912. In step 1914, the comparison between NC0 and NC0' is ended. Additionally, as shown in FIG. 8 for example, T4 is the time preset in accordance with the throttle opening and the type of shift.

The adaptive control begins in step 1916. In step 1916, judgment is made as to whether the throttle opening Ath during shifting has been constant in value or not, and, when it has been constant, the routine proceeds to step 1918, wherein a comparison between NC0i and NC0' is made. When the relationship of NC0i>NC0' is established, the completion of the shift in the second transmission section is earlier than that in the first transmission section. The routine proceeds to step 1920, where, in order to synchronize the completions of the shifts, the relationship Td=Td+td, where td is a constant determined in accordance with the throttle opening and the type of shift, is adopted to thereby delay the start of shift in the second transmission section. Furthermore, in step 1922, the value of T4 is updated.

In step 1918, when the relationship of NC0i>NC0' is not established, it is conceivable that the completion of the shift in the second tranmission section lags the completion of the shift in the first transmission section or that the completions of both shifts are synchronized with each other, and consquently, the start of shift in the second transmission section is quickened. Additionally, steps 1800–1803 are the steps concerned with a flag Ty.

According to this embodiment, the duty-control is not carried out and the control is simplified. Furthermore, the shift timings of the first and the second transmission sections can be satisfactorily controlled by the adaptive control as shown in FIG. 10.

As the hydraulic control circuit in this embodiment, a control circuit basically similar to the hydraulic circuit (described in FIG. 3) in the preceding embodiment can be used. However, such an arrangement may be adopted that the duty control by the solenoid valve S4 is not carried out, and instead, throttle pressure from a well-known throttle valve (not shown) is applied to a port 810 of the release control valve 800. With this arrangement, when drain oil pressure PB0 of the brake B0 is equal to or more the specific pressure PB0', which is determined by above the throttle pressure applied to the port 810 and by the resilient force of a spring 812, the release control valve 800 is brought into a state shown on the left side in FIG. 2. The ports 806 and 808 are short-circuited to each other, and thereby the oil pressure of the brake B0 is quickly drained. Alternately, when the oil pressure PB0 is less than the pressure PB0', the release valve 800 is brought into a state shown on the right side in FIG. 2, wherein the port 808 is closed, so that the oil pressure is slowly drained through an orifice 814. As a result, with every throttle opening, the second transmission section can start the shift precisely, and a releasing force of the second transmission section can be maintained at a proper value. Thus this embodiment is also able to avoid a lowered output torque due to the second transmission being in the neutral conditions. Additionally, when a quick drain command for brake B0 is outputted in step 1912, the solenoid valve S4 is turned off, whereby the ports 806 and 808 are forcedly short-circuited, thereby quickly draining the oil pressure in the brake B0.

In the above embodiments, to correct the value of the time delay Td between the start of the shifts of the second transmission section and the first transmission section, the time Td is increased or decreased by a predetermined value to maintain to between upper and lower limits. Alternatively, a time during which the relationship NC0>NC0' are established, is measured and the value of Td is changed by this time.

Further, in the above embodiment, the results of the shift timing have been detected by the variation in the rotation speed of the C0 drum member. Alternatively, however, the detection may be made by detecting the variation in the engine speed or the variation in the oil pressure supplied to the frictionally engaging devices.

Furthermore, in the above embodiment, degrees of correction of T5, NC0, Td and T4 are set in accordance with the engine load (throttle opening) and the type of shift. Alternatively, however, instead of these factors, or in addition thereto, the factor of the vehicle speed may be taken into consideration.

Figure 7:
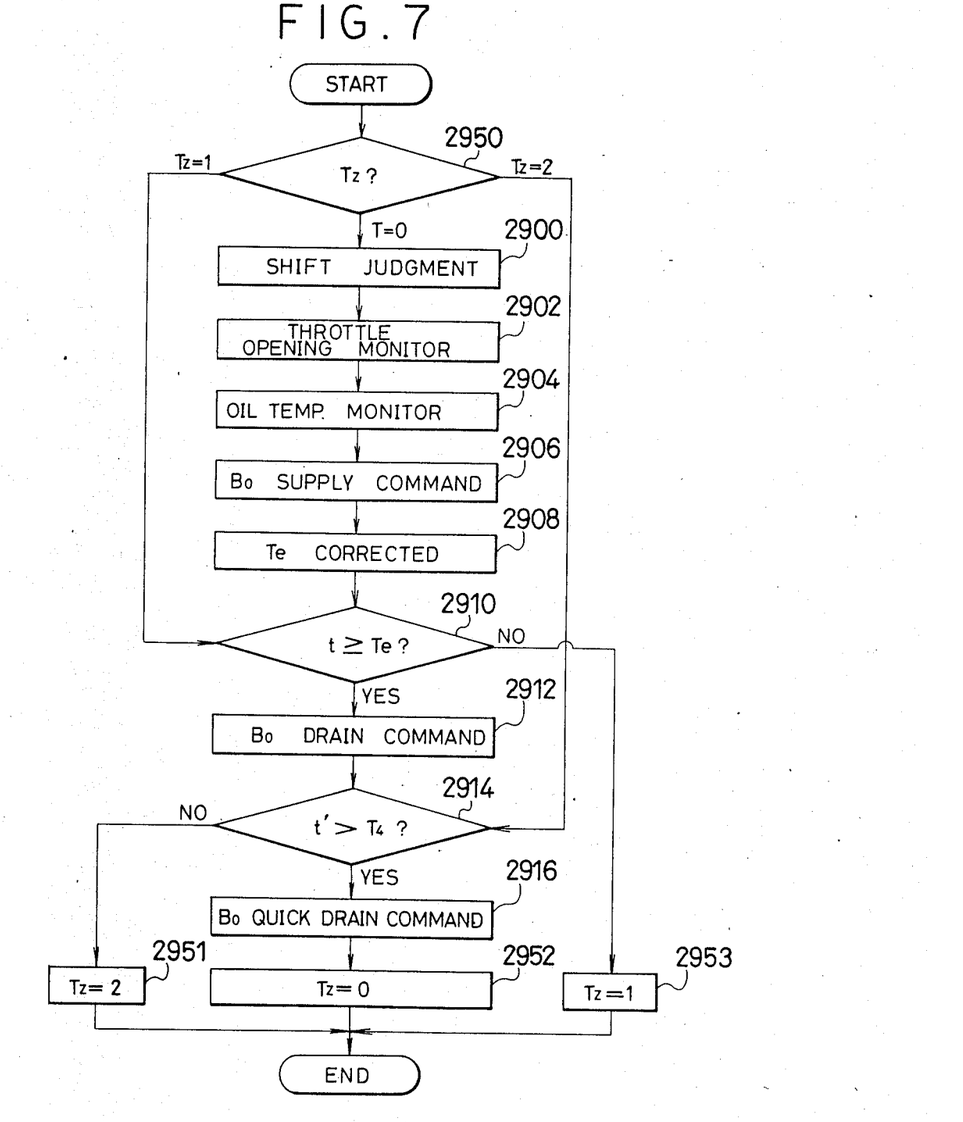
FIG. 7 is a flow chart showing a further control flow.

Next, FIG. 7 shows a third embodiment of the control flow. First, a flag Tz is set to zero. When judgment of shift is made by a shift point determined in accordance with the vehicle speed and the throttle opening in step 2900, the throttle opening is monitored again in step 2902, and the oil temperature of the automatic transmission is monitored in step 2904. Thereafter, in order to prepare the multi-shift demands, a predetermined extended time in accordance with the throttle opening is taken in step 2906 and a shift command (an ON command of the solenoid valve S1 for switching the 1st shift valve 200) for the first transmission section 60 is outputted, whereby the oil supply to the brake B2 is started.

In this control flow, an extended time Te is taken from a shift command for the first transmission section in step 2910. Thereafter, in step 2912, a shift starting command for the second transmission section 40 (an ON command from the solenoid valve S3 for switching the third shift valve 300) is outputted, whereby the drain of the oil pressure from the brake B0 is started. As a result, a low gear shift in the second transmission section 40 can be started during an inertia phase of the first transmission seection 60 and the ending of shifts of both transmission sections 40 and 60 can by synchronized.

Figure 9:
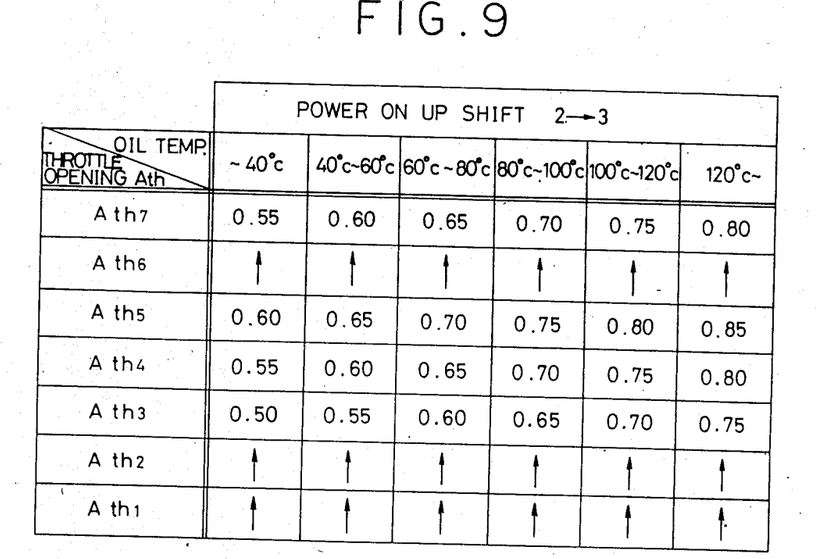
FIG. 9 is a chart showing an example of a map of Te.

In step 2908, the time Te is corrected and determined before the above described control. This time Te can be obtained, for example, through a map, as shown in FIG. 9, in accordance with the throttle opening, the type of shift, the oil temperature of the automatic transmission and a time which has elapsed since the drain of the oil pressure from the brake B2 due to the preceding shift. In FIG. 9, the shift intervals may be such that, for example, when the shift intervals are less than 30 sec, the respective values shown in FIG. 9 are multiplied by 0.8, when the search intervals are 30 sec or more and less than 60 sec, the respective values shown in FIG. 9 are multiplied by 1, and when the intervals are 60 sec or more, the respective values are multiplied by 1.2.

The reason why the oil temperature of the automatic transmission is considered to determine the time Te is that when the oil temperature is high or low, the oil leak value or the viscosity resistance of oil is different, causing the time of the supply or the drain of oil pressure to become different and the magnitudes of the influence rendered to the first and the second transmission sections to become different.

Because different throttle openings result in different flowing oil pressures (line pressure and the like) in this case, the throttle opening is similarly taken into consideration in this control flow. Furthermore, for example, if the shift in the first transmission section is performed by the engagement of the brake, and in the second transmission section by the releasing of the brake, then the timings of the respective shifts move in opposite directions, necessitating large corrections. As a consequence, the types of shifts are taken into consideration in this control flow.

On the other hand, for example, when a supply command of the oil pressure in the brake B2 is outputted immediately after the drain of the oil pressure in the brake B2 in the preceding shift, the oil still remains in the circuit, such that an oil supply time becomes very short as compared with the normal case. From this viewpoint in determining the time Te, a time since the preceding shift, i.e. the shift interval, should be taken into consideration. As a consequence, in this embodiment, the respective values shown in FIG. 9 are multiplied by the coefficients according to the time lengths of the aforesaid shift intervals, respectively.

After the drain command to the brake B0 is outputted in step 2912, the routine proceeds to step 2914, where judgment is made as to whether or not a time duration T4 has elapsed after the drain command to the brake B0 is outputted. Here, the time T4 is the constant determined in accordance with the throttle opening and the type of shift. When the result of the judgment is affirmative, the routine proceeds to step 2916, where a quick drain command to the brake B0 is outputted, so that the oil pressure in the brake B0 does not remain after the completion of the shift of the first transmission section 60. The reason why the quick drain command to the brake B0 is outputted in the time T4 has been described above.

Additionally, steps 2950–2953 relate to the flag T2 for substantially stopping the flow until the times Te and T4 elaspe in steps 2910 and 2914, respectively.

Figure 11:
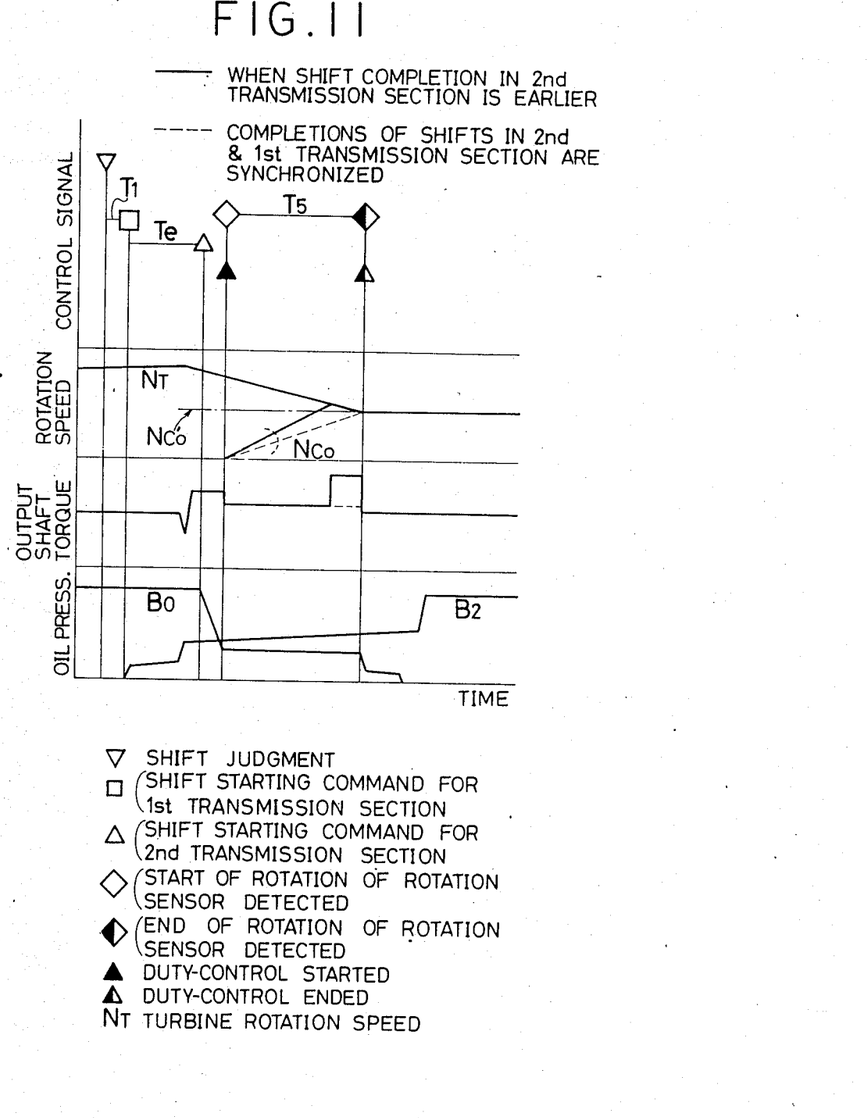

FIG. 11 is a chart showing the shift characteristics for qualitatively explaining the results of the control flow of third embodiment. Solid lines in the drawing show the shift characteristics when the oil temperature is low. In this case, Te is a value of time at which the completions of the shifts in the first and the second transmission sections can be synchronized with each other. When the oil temperature rises, it takes much time to supply the oil pressure to the brake B2. The oil pressure in the brake B2 is represented by a broken line in the drawing. Furthermore, the drain of the oil pressure in the brake B0 for shifting the second transmission section tends to be somewhat quickended. As a result, the completion of the shift becomes earlier than that of the first transmission section, whereby the output shaft torque abruptly rises after the shift in the second transmission section. In the case like this, the value of Te is increased, so that the completion of shifts in the first and the second transmission sections can be synchronized, thereby suppressing the abrupt rise of the output shaft torque.

In the above embodiments, the degree of correction to Te has been determined in accordance with the engine load and the type of shift, in addition to the oil temperature and the shift interval. In this embodiment, the factor of the vehicle speed may also be taken into consideration.

Furthermore, in this invention, the oil temperature of the automatic transmission need not necessarily be directly detected. For example, the oil temperature may be indirectly detected through the engine coolant temperature, the engine oil temperature, the temperature of the main body of engine, the temperature of the main body of automatic transmission and the like in view of the costs, the space for arrangement of the detectors and the like.

What is claimed is:

1. A shift control system of an automatic transmission, wherein said automatic transmission includes first and second transmission sections capable of automatically shifting gear stages independently to thereby achieve multi-stage shifts, said control system comprising:

means for starting a shift in said first transmission section;

means for starting a shift in said second transmission section at a time after the start of a shift in said first transmission section; and means for ending the shifts in said first and second transmission sections in synchronism with each other.

2. The shift control system as set forth in claim 1, further comprising:

means for detecting an engine load; and means for changing said time of the start of a shift in said second transmission section in accrodance with at least said engine load.

3. The shift control system as set forth in claim 1, further comprising:

means for detecting a vehicle speed; and means for changing said time of the start of a shift in said second transmission section in accordance at least said vehicle speed.

4. The shift control system as set forth in claim 1, further comprising:

means for detecting the types of shifts; and means for changing said time of the start of a shift in said second transmission section in accordance with at least said types of shifts.

5. The shift control system as set forth in claim 1, further comprising:

means for detecting a temperature of oil located in said automatic transmission; and means for changing said time of the start of a shift in said second tranmission section in accordance with at least said oil temperature of said automatic transmission.

6. The shift control system as set forth in claim 5, further comprising:

means for detecting an engine coolant temperature; and means for estimating said oil temperature based on said engine coolant temperature.

7. The shift control system as set forth in claim 1, further comprising:

means for detecting a time interval between a shift and a successive shift; and means for changing said time of the start of a shift in said second transmission section in accordance with at least said time interval.

8. A shift control system of an automatic transmission, wherein said automatic transmission includes first and second transmission sections capable of automatically shifting gear stages independently to thereby achieve multi-stage shifts, said control system comprising:

means for starting a shift in said first transmission section;

means for starting a shift in said second transmission section at a time after the start of a shift in said first transmission section;

means for ending the shifts in said first and second transmission sections in synchronism with each other; and means for detecting a result of a preceding shift timing; and means for correcting a succeeding shift control in said second transmission section based on said result of the preceding shift timing.

9. The shift control system as set forth in claim 8, further comprising:

means for detecting a variation in a rotation speed of a rotatable member of said automatic transmission; and means for detecting said result of said proceding shift timing in accordance with said variation in the rotation speed of the rotatable member of said automatic transmission.

10. The shift control system as set forth in claim 8, further comprising:

means for detecting a variation in an engine speed; and means for detecting said result of said preceding shift timing in accordance with said variation in said engine speed.

11. The shift control system as set forth in claim 8, further comprising:

means for changing forces acting on frictionally engaging members of said automatic transmission by duty-control of an oil pressure; and means for correcting said shift control by changing said forces.

12. The shift control system as set forth in claim 8, further comprising:

means for changing said time of the start of a shift in said second transmission section; and means for correcting said shift control by changing said time of the start of a shift.

13. The shift control system as set forth in claim 8, further comprising:

means for ending a shift in said second transmission section;

means for changing a timing of said ending; and means for correcting said shift control by changing said timing.

14. The shift control system as set forth in claim 8, further comprising:

means for detecting an engine load; and means for changing said correction of a shift control in accordance with at least said engine load.

15. The shift control system as set forth in claim 8, further comprising:

means for detecting a vehicle speed; and means for changing said correction of a shift control in accordance with at least said vehicle speed.

16. The shift control system as set forth in claim 8, further comprising:

means for detecting the types of shifts; and means for changing said correction of a shift control in accordance with at least said types of shifts.

17. The shift control system as set forth in claim 8, further comprising:

means for detecting a temperature of oil located in said automatic transmission; and means for changing said correction of a shift control in accordance with at least said oil temperature of the automatic transmission.

18. The shift control system as set forth in claim 17, further comprising:

means for detecting an engine coolant temperature; and means for estimating said oil temperature based on said engine coolant temperature.

19. The shift control system as set forth in claim 8, further comprising:

means for detecting a time interval between a shift and successive shift; and means for changing said correction of a shift control in accordance with at least said time interval.

20. The shift control system as set forth in claim 8, further comprising:

means for setting upper and lower limits of a correction value in correcting said shift control; and means for correcting said shift control only within the range of said upper and said lower limits.

21. The shift control system as set forth in claim 8, further comprising:

means for detecting an engine load;

means for determining whether said variation in the engine load is at a constant value; and means for correcting said shift control when said engine load is at said constant value.

* * * * *